April 18, 1950 N. B. STRACHOVSKY 2,504,750
UNIVERSAL JOINT
Filed Oct. 2, 1944 2 Sheets-Sheet 1
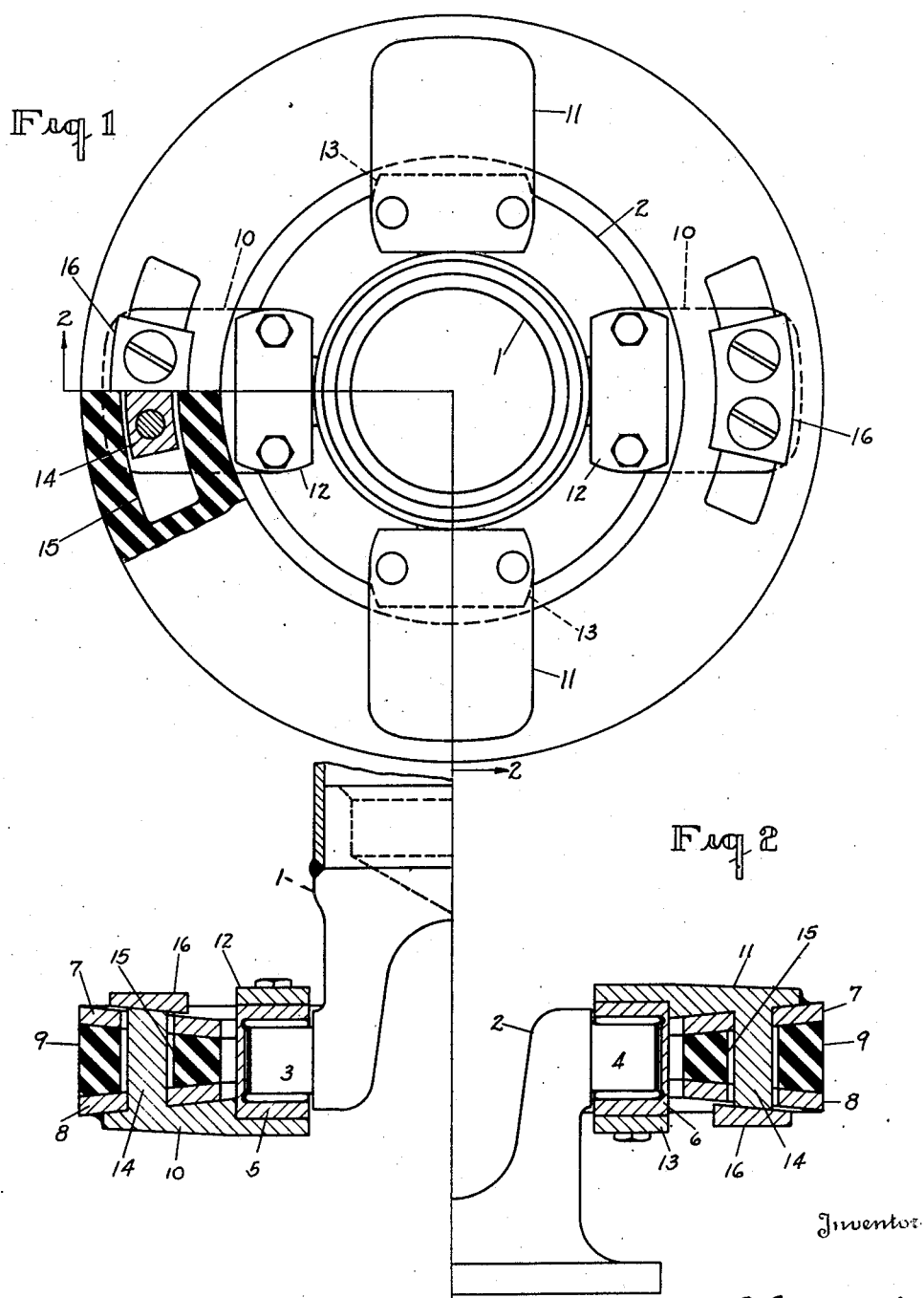
Inventor
Nikita B Strachovsky
By Ralph Hammar
Attorney Inventor
Nikita B Strachovsky
By Ralph Hummer
Attorney Patented Apr. 18, 1950

2,504,750

UNITED STATES PATENT OFFICE 2,504,750

UNIVERSAL JOINT

Nikita B. Strachovsky, Erie, Pa., assignor to Lord Manufacturing Company, Erie, Pa., a corporation of Pennsylvania Application October 2, 1944, Serial No. 556,758

5 Claims. (Cl. 64—13)

In universal joints of the conventional type operating through large angles, there is a variation in the instantaneous angular velocity of the driven member of the joint which imposes undesirable strains on the joint and the associated mechanism.

The object of my invention is to smooth out the effect of the variations in angular velocity by the interposition of a torsionally resilient connection. Further objects and advantages appear in the specification and claims.

Figure 3:
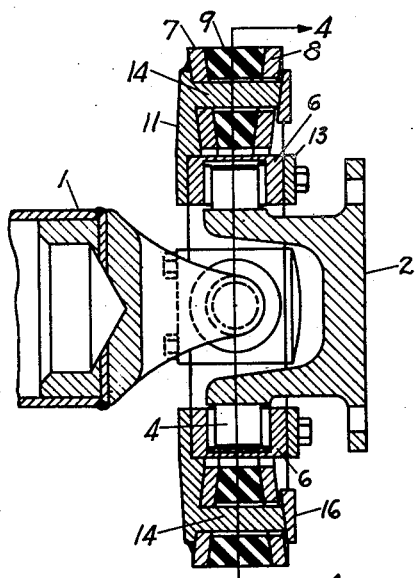
Figure 4:
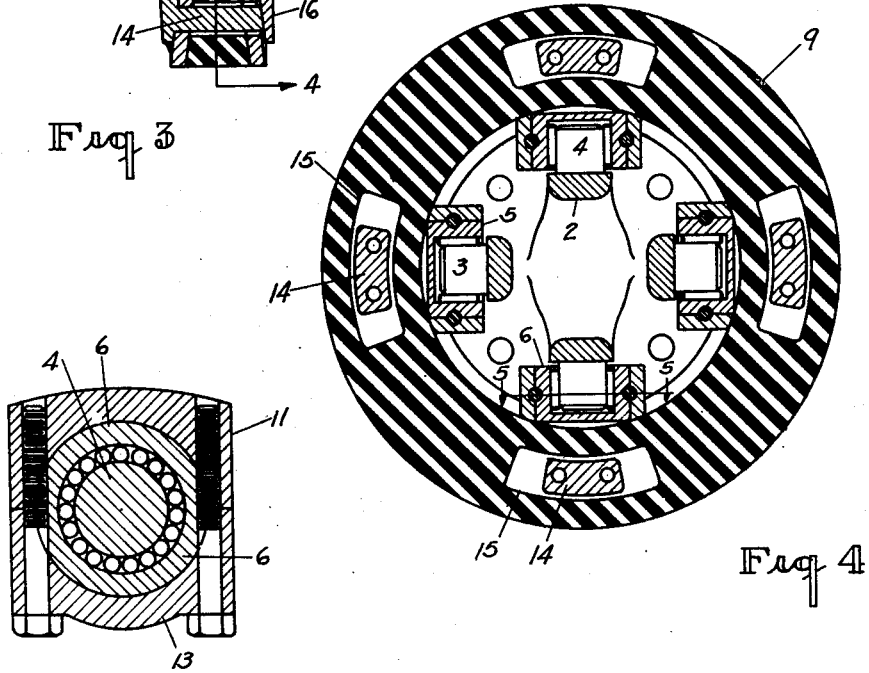
Figure 5:
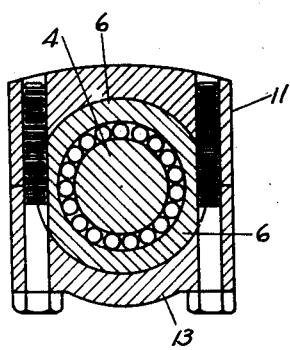

In the accompanying drawing, Fig. 1 is an end elevation of a universal joint embodying my invention; Fig. 2 is a sectional view on line 2—2 of Fig. 1; Fig. 3 is a sectional side elevation; Fig. 4 is a section on line 4—4 of Fig. 3; and Fig. 5 is a section on line 5—5 of Fig. 4.

Referring to the drawing, there is shown a universal joint having driving and driven members 1 and 2 having forked ends 3 and 4 received in needle bearings 5 and 6. As is customary, the axes of the bearings 5 and 6 are at right angles to each other.

Between the driving and driven members is an intermediate member comprising spaced rings 7 and 8 having opposed outwardly flaring faces concentric with the axis of the joint. Between and bonded to the opposed faces of the rings 7 and 8 is a rubber ring 9 which provides a torsionally resilient connection between the rings. Fixed to the outer faces of the rings 7 and 8 are bearing brackets 10 and 11 in which the bearings 5 and 6 are secured by clamps 12 and 13.

It will be noted that the members of the universal joint are secured to the more remote ring of the intermediate member. Integral with the bearing brackets 10 and 11 are lugs 14 which project through clearance openings 15 in the rubber and in the opposite ring. As shown in Fig. 4, the clearance openings limit the relative angular movement between the rings 7 and 8. Plates 16 are fastened to the outer ends of the lugs 14 to hold the parts together in case of failure of the rubber bond.

In the operation of the joint while transmitting power through large angles, there is a continual variation in the relative angular velocity of the driving and driven members of the joint which is cushioned in the present construction by the torsionally resilient connection provided by the rubber ring 9. The internal friction of the rubber also tends to damp torsional vibrations. Both the driving torque and the torsional vibrations are accommodated by shear of the rubber ring.

What I claim as new is:

1. In a universal joint, parts having spaced opposed surfaces surrounding the axis of the joint and connected by rubber bonded to the opposed surfaces, and driving and driven members having trunnions respectively pivoted on one and the other of said parts.

2. In a universal joint, driving and driven members, an intermediate member having two parts surrounding the axis of the joint and connected by a torsionally resilient connection, and trunnions pivoting the driving and driven members respectively on one and the other of said parts.

3. In a universal joint, spaced rings having opposed surfaces surrounding and transverse to the axis of the joint, a rubber element between and bonded to said surfaces, driving and driven members on opposite sides of the rings and angularly movable relative to the adjacent ring, and trunnions pivoting each member on the more remote of the rings.

4. In a universal joint, spaced rings having opposed surfaces transverse to the axis of the joint, a rubber element between and bonded to said surfaces, driving and driven members respectively pivoted to one and the other of said rings, and lugs on one of the rings extending through clearance openings in the rubber and the other ring for limiting the relative angular movement of the rings.

5. In a universal joint, driving and driven members, an intermediate member having two parts surrounding the axis of the joint, one adjacent the driven and the other adjacent the driving member, a rubber element connecting said parts and arranged to transmit torque between the parts by shear stress in the rubber, and trunnions pivoting the driving and driven members respectively on said one and other of said parts.

NIKITA B. STRACHOVSKY.

REFERENCES CITED

The following references are of record in the file of this patent:

UNITED STATES PATENTS

| Number | Name | Date |
|---|---|---|
| 1,707,309 | Leipert | Apr. 2, 1929 |
| 1,838,794 | Thiry | Dec. 29, 1931 |
| 1,881,326 | Peters | Oct. 4, 1932 |
| 2,051,442 | Geyer | Aug. 18, 1936 |
| 2,067,284 | Pearce | Jan. 12, 1937 |
| 2,271,567 | Olson | Feb. 3, 1942 |
| 2,290,421 | Fitz Gerald | July 21, 1942 |

FOREIGN PATENTS

| Number | Country | Date |
|---|---|---|
| 672,591 | Germany | 1939 |
| 730,596 | France | 1932 |